United States Patent
Rajendran

(10) Patent No.: US 12,113,561 B2
(45) Date of Patent: Oct. 8, 2024

(54) SYSTEMS AND METHODS WITHIN A RADIO BASE STATION TO DETECT AND RESOLVE WIRELESS NETWORK INTERFERENCE

(71) Applicant: DISH Wireless L.L.C., Englewood, CO (US)

(72) Inventor: Karupaiah Rajendran, Highlands Ranch, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 88 days.

(21) Appl. No.: 17/959,141

(22) Filed: Oct. 3, 2022

(65) Prior Publication Data
US 2024/0113736 A1 Apr. 4, 2024

(51) Int. Cl.
*H04B 1/12* (2006.01)
*H04B 1/10* (2006.01)
*H04B 17/318* (2015.01)

(52) U.S. Cl.
CPC ............. *H04B 1/12* (2013.01); *H04B 1/1027* (2013.01); *H04B 17/318* (2015.01)

(58) Field of Classification Search
CPC ....... H04B 1/12; H04B 1/1027; H04B 17/318
See application file for complete search history.

(56) References Cited

U.S. PATENT DOCUMENTS

| 11,394,475 | B1* | 7/2022 | Vaca | H04W 24/08 |
| 2003/0073435 | A1* | 4/2003 | Thompson | H04B 7/18513 |
| | | | | 455/1 |
| 2008/0200195 | A1* | 8/2008 | Abe | H04W 16/14 |
| | | | | 455/501 |
| 2017/0302389 | A1* | 10/2017 | Yoshida | H04B 17/29 |
| 2023/0318884 | A1* | 10/2023 | Mueck | H04L 25/0248 |
| | | | | 375/267 |

* cited by examiner

*Primary Examiner* — Junpeng Chen
(74) *Attorney, Agent, or Firm* — Seed IP Law Group LLP

(57) ABSTRACT

An interference mitigation system is provided herein. The interference mitigation system selects a threshold power range for signals received by at least one antenna and compares a power level of a signal to the threshold power range. Based on a determination of whether the power level of the first signal exceeds the threshold power range, the interference mitigation system identifies nodes that transmit or receive wireless signals and causes the nodes to stop transmitting or receiving signals for a selected duration of time. The interference mitigation system receives additional signals during the selected duration of time, and determines whether the first signal caused internal interference or external interference based on the additional signals and the first signal. The interference mitigation system causes the interference to be resolved based on the determination of whether the interference is internal interference or external interference.

17 Claims, 7 Drawing Sheets

| SNO | BAND | DL/UL BW | ACCEPTABLE RANGE B/W PORTS – NO LOAD |
|---|---|---|---|
| 1 | n71 | 5 MHz | −105.2 dBm TO −105.6dBm +/− 2dB |
| 2 | n66 | 5 MHz | −105.4 dBm TO −105.7dBm +/− 2dB |
| 3 | n70 | 5 MHz | −104.8 dBm TO −105dBm +/− 2dB |

SYSTEMS AND METHODS WITHIN A RADIO BASE STATION TO DETECT AND RESOLVE WIRELESS NETWORK INTERFERENCE

BACKGROUND

Networks, such as telecommunication networks, mobile networks, 5G networks, 4G networks, or other types of networks (collectively "networks"), typically experience interference caused by signals that may not originate from devices associated with the network. Furthermore, such networks may be authorized by an entity, such as a government entity, to exclusively operate within particular frequency bands. Interference of signals transmitted via the network at these frequency bands can be caused from internal or external sources. It is with respect to these and other considerations that the embodiments described herein have been made.

BRIEF SUMMARY

The embodiments disclosed herein improve the technology of mobile network and mitigation of network interference by providing a technical solution that identifies whether interference is internal interference or external interference and causes the mitigation of that interference. The embodiments disclosed herein may identify whether interference is internal interference or external interference by instructing nodes within an area to stop devices connected to the network to from transmitting signals for a short period of time. During this short period of time, a node that has detected interference related to a first signal may receive additional signals that were transmitted in the area. These additional signals may be used to determine whether the source of the interference is associated with the network or associated with an entity other than the network. The embodiments disclosed herein are able to use the identified source of the interference to cause the interference to be mitigated.

In some embodiments, an interference mitigation system selects a threshold power range for signals received by at least one antenna. The interference mitigation system may receive, via the antenna, a first signal within a sector within a sector of a wireless network, the sector representing a geographic area within which the wireless network provides service to a plurality of user devices. The interference mitigation system may determine whether a power level of the first signal is outside of the threshold power range. Based on the determination of whether the power level of the first signal is outside of the threshold power range, the interference mitigation system may identify one or more nodes within the wireless sector and cause the one or more nodes to stop transmitting or receiving signals for a selected duration if time. In response to receiving one or more additional signals at the at least one antenna, the interference mitigation system may determine whether interference caused by the first signal is internal interference or external interference based on the additional signals. The interference mitigation system may cause the interference to be mitigated based on the determination of whether the interference is internal interference or external interference.

In some embodiments, the at least one antenna is an antenna in a radio base station of the wireless network. In some embodiments, the wireless network is a cellular telecommunication network.

In some embodiments, the interference mitigation system determines whether the interference is external interference or external interference by receiving scheduling data indicating when user devices located within the wireless sector are to transmit signals in the wireless sector. The interference mitigation system may use the scheduling data to determine whether receipt of the first signal by the antenna was expected. The additional signals may be received by the antenna from devices located within the wireless sector. The interference mitigation system may use the scheduling data to determine, for each of the additional signals, whether the signal was expected by at least one node. The interference mitigation system may determine whether a detected power level of at least one signal of the additional signals exceeds the threshold power range. The interference mitigation system may determine whether interference caused by the first signal is internal interference or external interference based on the determination of whether the detected power level of at least one signal of the additional signals exceeds the threshold power range.

In some embodiments, the interference mitigation system receives one or more additional signals by causing an orientation of at least one antenna to change from a first orientation to a second orientation. The at least one antenna may receive at least a portion of the one or more additional signals while it is in the second orientation. The interference mitigation system may identify a location of a source of a signal that has a power level that is outside of a threshold range and that is one of the additional signals based on the additional signals and the portion of the additional signals.

In some embodiments, the interference mitigation system determines whether the power level of a signal exceeds a threshold power range by receiving a location of a device that transmitted the first signal. The interference mitigation system may determine whether the power level of the first signal exceeds the threshold power range for signals received by the at least one antenna based on the data indicating the threshold power range and the location of the user device.

In some embodiments, the interference mitigation system receives additional data indicating one or more of: one or more periods of time in which the at least one antenna received a signal that exceeded the threshold power range; an indication of one or more hardware faults associated with at least one network component included in the network; an indication of one or more alarms associated with at least one network fault in the network; an indication of one or more cabling issues associated with the network; and an indication of one or more known sources of external interference. The interference mitigation system may use the additional data and the determination of whether the first signal has caused internal interference or external interference to predict a cause of the interference associated with the first signal.

In some embodiments, the interference mitigation system uses a prediction of the cause of the interference to identify one or more entities able to remedy the cause of the interference. The interference mitigation system may cause a message to be transmitted to at least one of the identified entities instructing the at least one entity to remedy the cause of the interference.

In some embodiments, the interference mitigation system receives second additional data indicating a current load of the network. The interference mitigation system may determine a measure of priority for remedying the cause of the interference based on at least the second additional data and the cause of the interference. The interference mitigation system may cause the interference to be mitigated based on the measure of the priority.

In some embodiments, the interference mitigation system identifies one or more frequency bands affected by the interference. The interference mitigation system may mitigate the interference by causing at least a portion of the plurality of user devices to stop using the one or more frequency bands that are affected by the interference.

DETAILED DESCRIPTION

Figure 1:
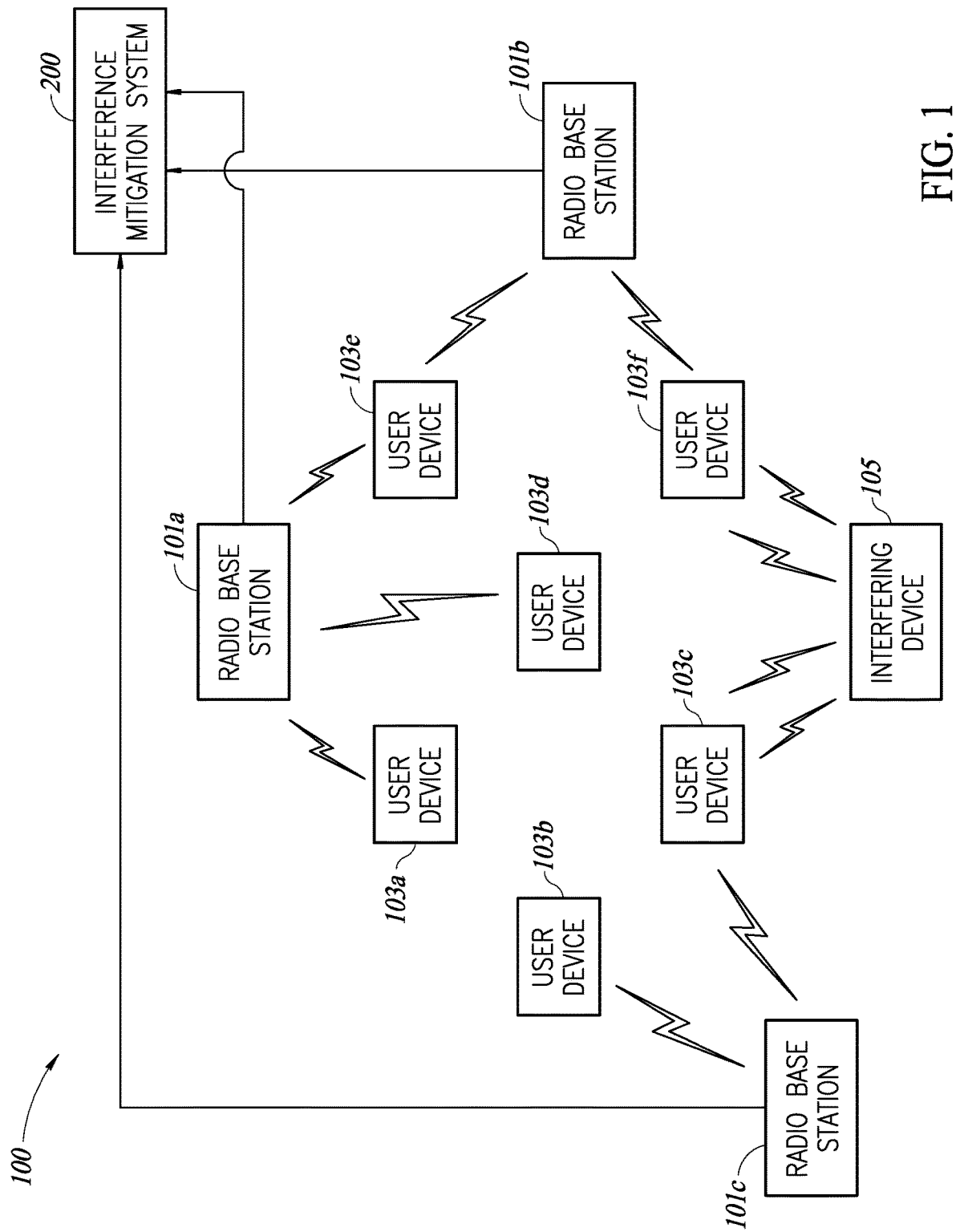
FIG. 1 is a display diagram depicting a sample environment in which an interference mitigation system operates, according to various embodiments described herein.

Networks that provide networking services to large amounts of user devices typically transmit and receive signals within certain frequency bands in order to provide networking services. An entity that owns or operates the network may obtain rights, such as exclusive rights, to transmit and receive signals within the certain frequency bands from another entity, such as a government entity. Components in the network, such as radio base stations or nodes, schedule when devices are permitted to transmit signals related to the networking services provided to such devices. These components may further be separated into "wireless sectors" that represent a geographic area within which the network provides services to a user. A network may have multiple wireless sectors, and each wireless sector may have its own components that manage, schedule, etc., the transmission of signals by user devices and network components.

Although transmission of signals is scheduled within the network and the network may have exclusive rights to the use of certain frequency bands, interference may still occur on the network due to unexpected signals, signals that have too much or too little power, or other sources of interference. For example, an entity operating an interfering device may configure their device to transmit signals at the certain frequency bands, even though the network has the rights to transmit signals at such bands. As another example, an issue with network components, user device components, or distance, may change the power level or frequency bands of signals sent by devices that are intended to use the network services. In order to adequately remedy or mitigate the interference, the cause of the interference should be identified as either a cause external to the network, such as the entity operating the interfering device ("external interference"), or a cause internal to the network, such as the issue with network components, user device components, or distance ("internal interference").

Current techniques to determine whether interference is external or internal include shutting down radio base stations or nodes during times that historically have a smaller amount of network traffic. However, such techniques require radio base stations or nodes to be shut down at off-peak hours, typically during the middle of the night, in order to allow network engineers enough time to manually search the logs without causing a disruption to service provided by the network. As a result, interference that occurs during other times may still affect network services without being detected or mitigated so long as it does not continue to occur during the time network engineers are manually searching the logs.

Furthermore, the current techniques require the network capacity to be lowered within a wireless sector because nodes and radio base stations within the sector are being taken down to identify the interference. This does not cause an issue during the middle of the night, when network services are historically not used at the same rate as during the day, however, this would cause significant disruptions performed during the day. Thus, for interference that occurs during the day, the cause of the interference cannot be identified until the next time network usage is low, at which time the interference may have already stopped. This means that the interference may potentially occur, disrupt service, and disappear before current techniques are able to identify and mitigate the interference, thus causing a disruption in the service to user devices in the wireless sector. Such techniques are generally unable to diagnose the cause of interference as it occurs, as they cause a large disruption in the network services provided to users.

The embodiments disclosed herein address the issues above and thus help solve the above technical problems and improve the technology of mobile network and mitigation of network interference by providing a technical solution that identifies whether interference is internal interference or external interference and causes the mitigation of that interference. The embodiments disclosed herein are further able to be used to identify and mitigate interference at any time without causing a disruption of network services provided to user devices, thereby reducing the need to attempt to mitigate interference during times that have a smaller amount of network traffic. Furthermore, the embodiments described herein may also be used to identify particular sources of interference, and to cause interference to be mitigated based on the source of the interference.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed to include "and/or" unless the content clearly dictates otherwise. The term "and/or" is generally employed to include an inclusive or.

The headings and Abstract of the Disclosure provided herein are for convenience only and do not interpret the scope or meaning of the embodiments.

FIG. 1 is a display diagram depicting a sample environment 100 in which an interference mitigation system 200 operates, according to various embodiments described herein. The environment 100 includes radio base stations 101a-101c, user devices 103a-103f, an interfering device 105, and an interference mitigation system 200. The environment 100 is one instance of an environment in which the interference mitigation system 200 may operate, and the interference mitigation system 200 may operate in other environments. Moreover, the interference mitigation system 200 may be included in one or more of the devices or base stations described in FIG. 1 or in other computing devices not illustrated in FIG. 1. The interference mitigation system 200 is discussed below, in connection with FIG. 2.

The radio base stations 101a-101c (collectively "radio base stations 101" or individually as "radio base station 101") are each radio base stations that operate on a network, such as, for example, a telecommunications network, a 4G/5G network, or any other type of network that provides access to networking services to user devices. A radio base station, such as the radio base stations 101 may facilitate the transmission and reception of signals to and from devices connected to a network. A radio base station may operate within a wireless sector, and may communicate with other radio base stations within the wireless sector, the network, etc. A radio base station may be or include one or more nodes, such as, for example, a Node B, eNode B, gNodeB, or other types of nodes. A radio base station may further have at least one antenna (not shown) that is used to transmit and receive signals from various devices, radio base stations, network components, an interference mitigation system, or other computing devices. In facilitating the transmission and reception of signals, the radio base station may instruct devices, such as user devices 103a-103f, to transmit signals at certain times. In this way, a radio base station is able to schedule the transmission of signals to avoid signal collisions or other similar interference.

The user devices 103a-103f (collectively "user devices 103" or individually as "user device 103") may be one or more endpoint devices, such as PCs, tablets, laptop computers, smartphones, personal assistants, drones, Internet connection devices, wireless LAN, Wi-Fi, Worldwide Interoperability for Microwave Access (WiMax) devices, or the like, and may be communicatively coupled to the network or to each other so that the plurality of endpoint devices are communicatively coupled together. The user devices 103 may be communicatively coupled to the network via interaction with a radio base station, such as one or more of the radio base stations 101. The user devices 103 may receive instructions from such a radio base station indicating when the user device is to transmit signals on the network.

The interfering device 105 may be any source of a signal that causes interference on the network. In some cases, the interfering device 105 may be a device connected to the network, but has malfunctioned in some manner. In other cases, the interfering device 105 may be a device not connected to or associated with the network, but which is transmitting signals at frequency bands reserved for the network.

The network within which the radio base stations 101 and user devices 103 operate may be a network, communication system, or networked system (not shown), to which the user devices 103a-103f, radio base stations 101a-101c, and interference mitigation system 200, may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like.

Figures 2, 3:
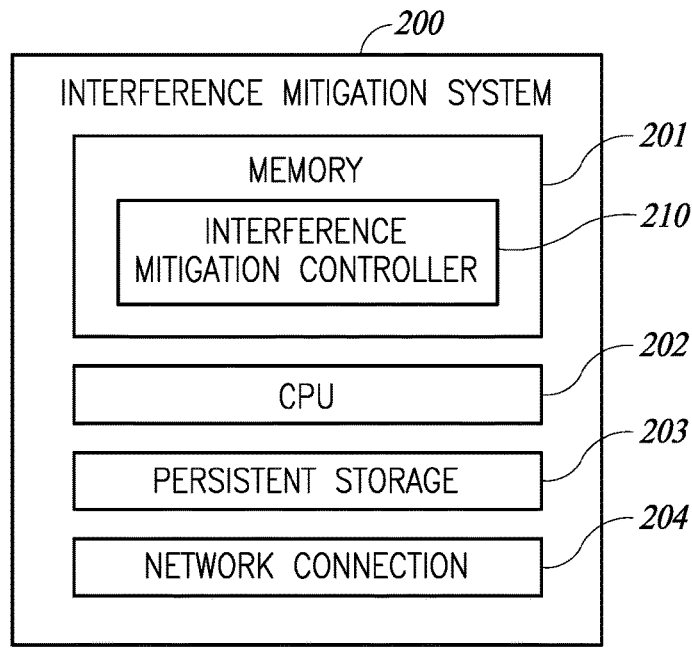
FIG. 2 is a block diagram depicting example computer components incorporated in an interference mitigation system, according to various embodiments described herein.
FIG. 3 is a table diagram depicting a sample threshold range data table, according to various embodiments described herein.

FIG. 2 is a block diagram depicting example computer components incorporated in an interference mitigation system 200, according to various embodiments described herein. The interference mitigation system 200 may be: located on a network in a position to communicate with one or more radio base stations, user devices, interfering devices, or any entity associated with any of the nodes, radio base stations, user devices, network, or interfering devices; integrated as part of a node or radio base station, such as the radio base stations 101; or located at any other devices in which the interference mitigation system 200 is able to perform at least some of its functions. In various embodiments, the interference mitigation system 200 includes one or more of the following: a computer memory 201, a central processing unit 202, a persistent storage device 203, and a network connection 204. The memory 201 may be used for storing programs and data while they are being used, including data associated with the various signals (not shown), radio base stations, user devices, interfering devices, an operating system including a kernel (not shown), and device drivers (not shown). The central processing unit (CPU) 202 may be used for executing computer programs (not shown), such as computer programs which perform some or all of the functions of the interference mitigation system. In some embodiments, the CPU 202 is be a processor, microcontroller, or other computer component used for executing computer instructions. The persistent storage device 203 may be a hard drive or flash drive for persistently storing programs and data. The network connection 204 may be used for connecting to one or more radio base stations or other computer systems (not shown), to send or receive data, such as via the Internet or another network and associated networking hardware, such as switches, routers, repeaters, electrical cables and optical fibers, light emitters and receivers, radio transmitters and receivers, and the like, and to scan for and retrieve signals associated with user devices, interfering devices, radio base stations, devices or components associated with the network, and for connecting to one or more computer devices such as radio base stations, user devices, interfering devices, devices or components associated with the network, or other computer systems. In various embodiments, the interference mitigation system 200 additionally includes input and output devices, such as a keyboard, a mouse, display devices, etc. In some embodiments, all or part of the interference prediction system 200 is included within a radio base station, such as the radio base stations 101 described above in connection with FIG. 1.

While an interference mitigation system 200 configured as described may be used in some embodiments, in various other embodiments, the interference mitigation system 200 may be implemented using devices of various types and configurations, and having various components. The memory 201 may include an interference mitigation controller 210, which contains computer-executable instructions that, when executed by the CPU 202, cause the interference mitigation system 200 to perform the operations and functions described herein. For example, the programs referenced above, which may be stored in computer memory 201, may include or be comprised of such computer-executable instructions. The memory 201 may also include an interference mitigation data structure, which includes data related to operations performed by the interference mitigation system.

The interference mitigation controller 210 performs the core functions of the interference mitigation system 200, as discussed herein and also with respect to FIGS. 3-8. In particular, the interference mitigation controller 210 determines whether a signal causes interference by comparing the power level of the signal to a threshold range of power levels for signals received by a radio base station. Additionally, the interference mitigation controller 210 determines whether the interference is external interference or internal interference and causes the interference to be mitigated based on such a determination. The interference mitigation controller 210 may also perform other functions related to detecting or mitigating interference as described herein.

In an example embodiment, the interference mitigation controller 210 or computer-executable instructions stored on memory 201 of the interference mitigation system 200 are implemented using standard programming techniques. For example, the interference mitigation controller 210 or computer-executable instructions stored on memory 201 of the interference mitigation system 200 may be implemented as a "native" executable running on CPU 202, along with one or more static or dynamic libraries. In other embodiments, the interference mitigation controller 210 or computer-executable instructions stored on memory 201 of the interference mitigation system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented or performed by each component/module, and in different orders, and by different components/modules, yet still achieve the functions of the interference mitigation controller 200.

In addition, programming interfaces to the data stored as part of the interference mitigation controller 210 can be available by standard mechanisms such as through C, C++, C#, Java, and web APIs; libraries for accessing files, databases, or other data repositories; through scripting languages such as JavaScript and VBScript; or through Web servers, FTP servers, or other types of servers providing access to stored data. The interference mitigation controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the interference mitigation controller 200.

Furthermore, in some embodiments, some or all of the components/portions of the interference mitigation controller 210, or functionality provided by the computer-executable instructions stored on memory 201 of the interference mitigation system 200 may be implemented or provided in other manners, such as at least partially in firmware or hardware, including, but not limited to, one or more application-specific integrated circuits (ASICs), standard integrated circuits, controllers (e.g., by executing appropriate instructions, and including microcontrollers or embedded controllers), field-programmable gate arrays (FPGAs), complex programmable logic devices (CPLDs), and the like. Some or all of the system components or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the user devices, radio base stations, interface mitigation system, interfering devices, etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The operation of certain aspects will now be described with respect to FIGS. 3-8. In at least one of various embodiments, processes 500, 600, 700, and 800 described in conjunction with FIGS. 5-8, respectively, may be implemented by one or more processors or executed via circuitry on one or more computing devices, such as the interference mitigation system 200 described in connection with FIG. 2, a radio base station, such as the radio bases station 101 described in connection with FIG. 1, or other computing devices.

FIG. 3 is a table diagram depicting a sample threshold range data table 300, according to various embodiments described herein. The threshold range data table 300 includes sample data that is in human-readable form and implementations of the interference mitigation system may include data in other forms. Furthermore, the threshold range data table 300 is non-exhaustive, and implementations of the interference mitigation system may include additional data, rows, columns, etc., which are not shown in FIG. 3.

The threshold range data table includes an SNO column 311, a band column 313, a downlink uplink bandwidth column 315, and an acceptable range column 317, and rows 301, 303, and 305. The SNO column 311 includes data indicating an individual node. The node may be a node within a radio base station, such as the radio base station 101. The band column 313 includes data indicating a frequency band upon which a node operates. The downlink uplink bandwidth column 315 includes data indicating the bandwidth that the node has for downlink and uplink signals. The acceptable range column 317 includes data indicating an acceptable, or "threshold," power range for signals detected by the node.

Each row in the threshold range data table 300 includes data related to a node identified in the SNO column 311. As an example, row 301 indicates that a node operates on the "n71" band, has a bandwidth of five megahertz, and has an acceptable range of "−105.2 dBm TO−105.6 dBm+/−2 dB." Thus, the acceptable range of the node indicated in row 301 is between −105.2 dBm and −105.6 dBm with a margin of error of 2 dB. In this example, signals received by the node indicated by row 301 may be presumed not to be interference if their measured power level was within the acceptable range, and may be presumed to be interference if their measured power level was outside of the acceptable range.

The acceptable range indicated in column 317 may be determined or selected based on baseline testing performed on the hardware included in the node. In some embodiments, the baseline testing includes placing the hardware within an area that does not receive any signals and measuring the performance of the hardware with signals at varying power level ranges. In some embodiments, the baseline testing includes using an emulator, such as a DU emulator, to emulate the hardware of the node.

The acceptable range indicated in column 317 may change based on a variety of factors, such as the current load on the network, resources available to the radio base station, the presence of interference, etc. In some embodiments, changes to the acceptable range are made automatically, such as dynamically as the variety of factors change, when interference is detected at a certain power level or range of power levels, or at other times. For example, the interference mitigation system may receive an indication that network load is currently low and there are fewer resources available to the radio base station to detect signals. In such an example, the interference mitigation system may determine that the acceptable power range should be expanded to include additional power levels, thus allowing the radio base station to detect more signals than it normally would. In another example, the interference prediction system may determine that interference is being frequently caused by a signal within the acceptable power range. In response, the interference prediction system may decrease the acceptable power range until the source of the signal is identified and the cause of the interference is resolved. In some embodiments, changing the acceptable power range includes one or more of: changing a margin of error of the power range, changing one or more bounds of the power range, or other methods of changing a power range.

Figure 4:
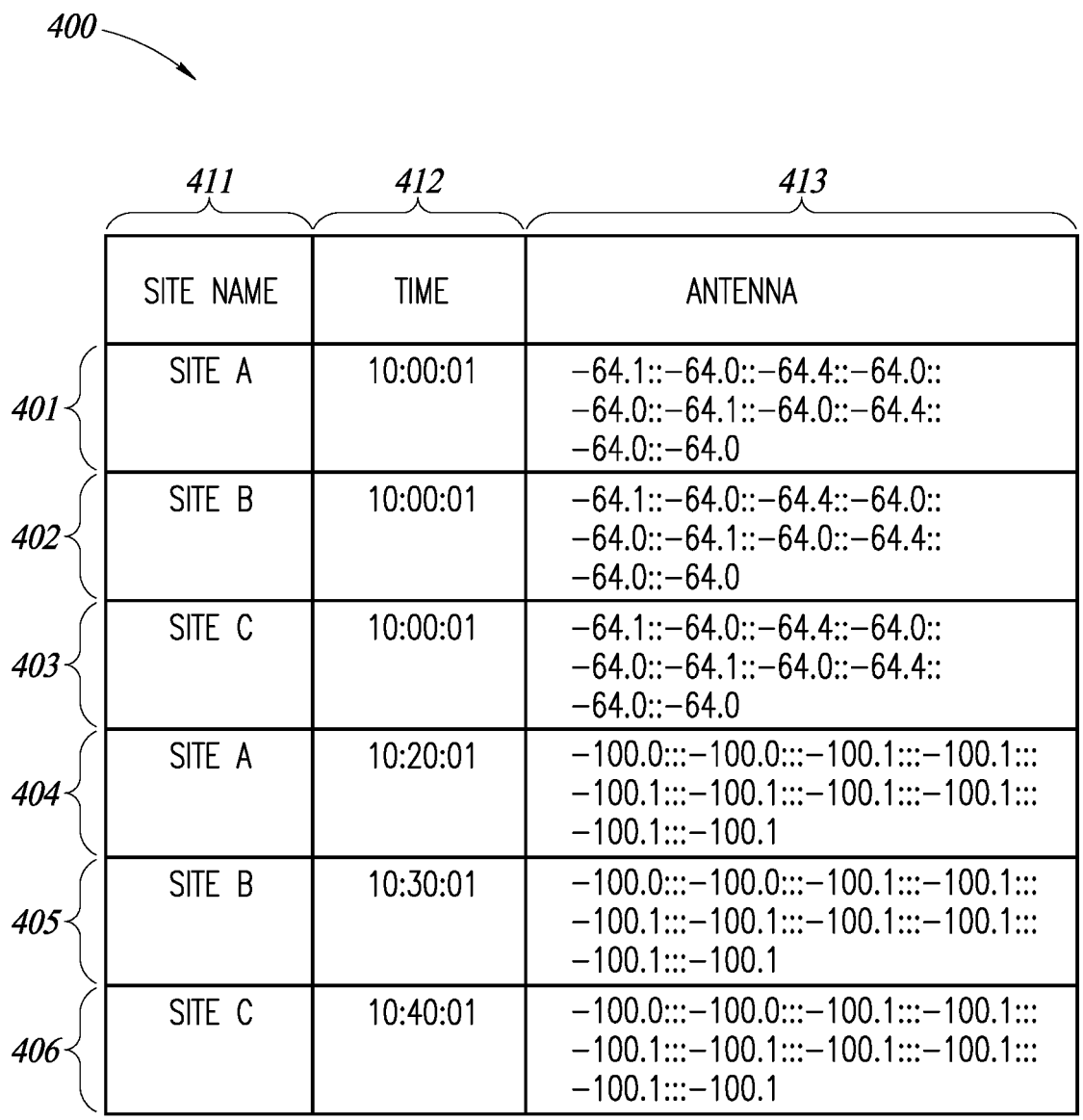
FIG. 4 is a table diagram depicting a sample interference detection data table, according to various embodiments described herein.

FIG. 4 is a table diagram depicting a sample interference detection data table 400, according to various embodiments described herein. The interference detection data table 400 includes sample data that is in human-readable form and implementations of the interference mitigation system may include data in other forms. Furthermore, the interference detection data table 400 is non-exhaustive, and implementations of the interference mitigation system may include additional data, rows, columns, etc., which are not shown in FIG. 4.

The interference detection data table 400 includes a site name column 411, a time column 412, an antenna column 413, and rows 401-406. The site name column 411 includes data indicating a radio base station, such as a radio base station 101. The time column 412 includes data indicating the time at which a signal was received. The antenna column 413 includes data indicating the power level of a signal received by antenna associated with the site.

As an example, rows 401-403 each indicate that at time "10:00:01" three different sites received a signal with a power level of "−64.1::−64.0::−64.4::−64.0::−64.0::−64.1::−64.0::−64.4::−64.0::−64.0." The power level detected by these signals may indicate that the signals are interference based on a determination of whether the power level is within a threshold power range for each of the sites. In contrast, rows 404-406 each indicate that signals with a power level of "−100.0::−100.0::−100.1::−100.1::−100.1::−100.1::−100.1::−100.1::−100.1::−100.1" were detected at later times.

The interference mitigation system may use the data included in the sample interference detection table 400 to determine whether interference is internal interference or external interference, to locate a source of the signal or interference, or for other functions described herein. For example, if the signals indicated at rows 401-403 are determined to be caused by external interference, the interference mitigation system may use a location of each of the sites indicated in rows 401-403 to calculate an area within which the signal may have originated.

The interference detection table 400 and threshold range data table 300 may be used in connection with any of the processes performed by the interference mitigation system, including the processes described below with regards to FIGS. 5-8.

Figure 5:
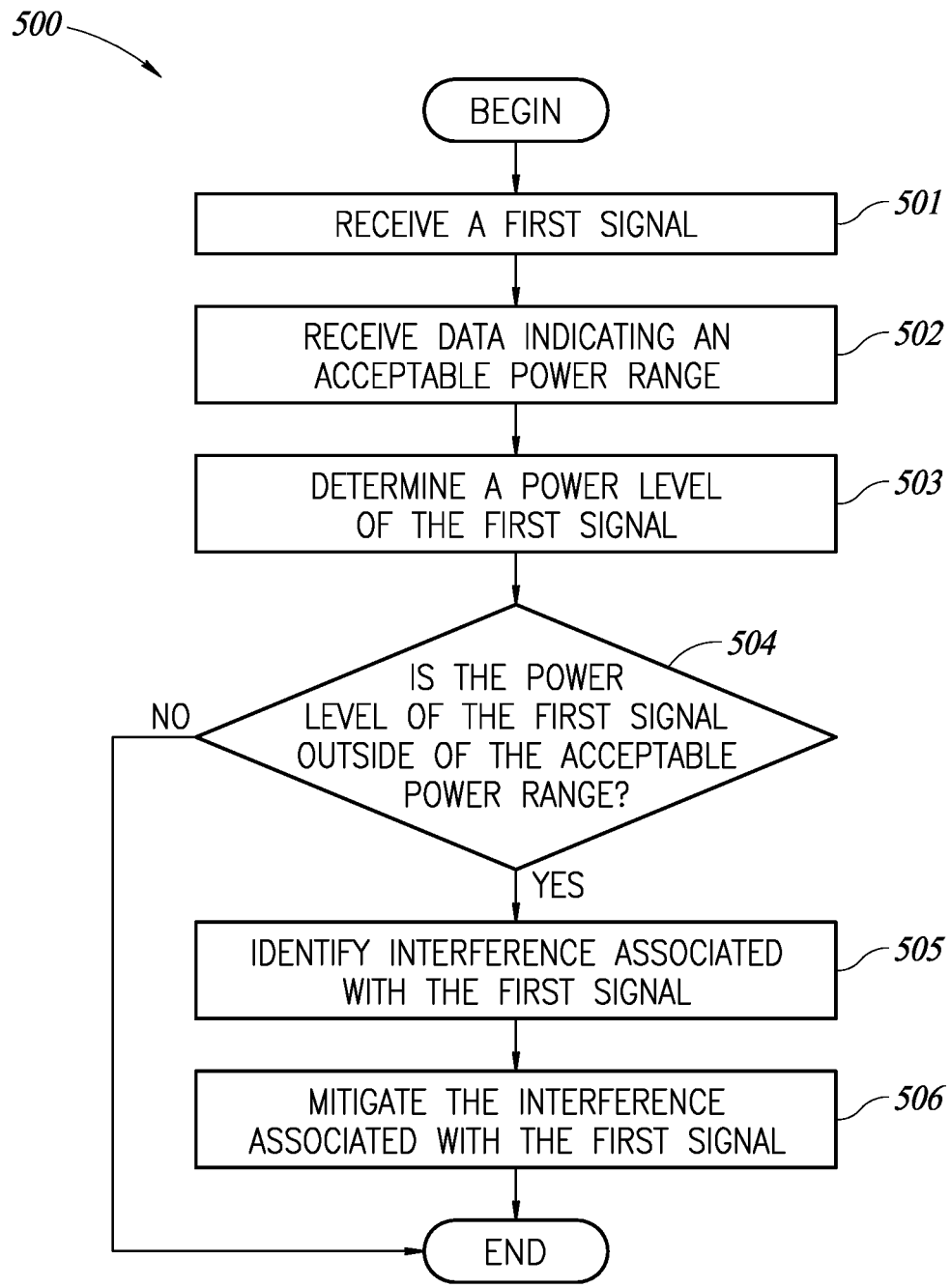
FIG. 5 is a flow diagram depicting a process used to mitigate interference associated with signals received at a radio base station.

FIG. 5 is a flow diagram depicting a process 500 used to mitigate interference associated with signals received at a radio base station. The process 500 begins, after a start block, at act 501, where the interference prediction system receives an indication of a first signal. This first signal is a radio frequency signal that is received at an antenna of a node or radio base station in the network. In some embodiments, an antenna included in a node receives the indication of the first signal.

The process 500 proceeds to act 502, where the interference prediction system receives data indicating an acceptable power range for received signals. In some embodiments, the acceptable power range is received, selected, etc., based on one or more of: data describing the node at which the signal is received, weather or other conditions occurring at the time the signal is received, a load or capacity of the network, a location of a device that transmitted the first signal, a frequency band at which the node is configured to receive signals, or other data usable to determine an acceptable power range for signals received at an antenna. The acceptable power range may be selected from a threshold range data table, such as the threshold range data table 300.

The process 500 proceeds to act 503, where the interference prediction system determines a power level of the first signal. In some embodiments, the power level of the first signal is determined based on a received signal strength indicator (RSSI) of the first signal.

The process 500 proceeds to decision 504, where the interference prediction system determines whether the power level of the first signal is outside of the acceptable power range. If the power level of the first signal is not outside of the acceptable power range, the process ends. Otherwise, the process continues to act 505. In some embodiments, a power level is considered to be outside of the acceptable power range if it is higher or lower than the outer bounds of the power range. In some embodiments, a power level is considered to be inside an acceptable power range if it is within, or equal to, the outer bounds of the power range. In some embodiments, the interference mitigation system determines whether the power level of the first signal is outside of the acceptable power range based on the distance of the source of the first signal to the node and the power level of the signal when it is received by the node. The distance of the source of the first signal from the node may be determined based on a location of a device transmitting the first signal, properties of the first signal that may indicate the distance that the signal has traveled from its source, or other methods of determining a distance of the source of a signal from the antenna that detects the signal.

At act 505, the interference prediction system identifies the interference associated with the first signal. The interference prediction system may identify the interference associated with the first signal based on the determination that the power level of the first signal is outside of the acceptable power range. In some embodiments, the interference prediction system identifies the interference associated with the first signal by determining whether the first signal was expected at the node. For example, instances where the first signal is expected at the node but the power level of the first signal is outside of the acceptable power range may be classified as interference because the first signal should have reached the node at a power level within the acceptable power range.

Process 500 proceeds to act 506, where the interference prediction system mitigates the interference associated with the first signal. The interference prediction system may mitigate the interference based on the identification of the interference obtained in act 505, such as an identification of whether the interference is caused by internal interference or external interference. In some embodiments, act 506 is performed by performing the process 600 described below in connection with FIG. 6.

After act 506, the process 500 ends. The process 500 may be performed at predetermined times, randomly, continuously as signals are received, periodically, or any combination thereof.

Figure 6:
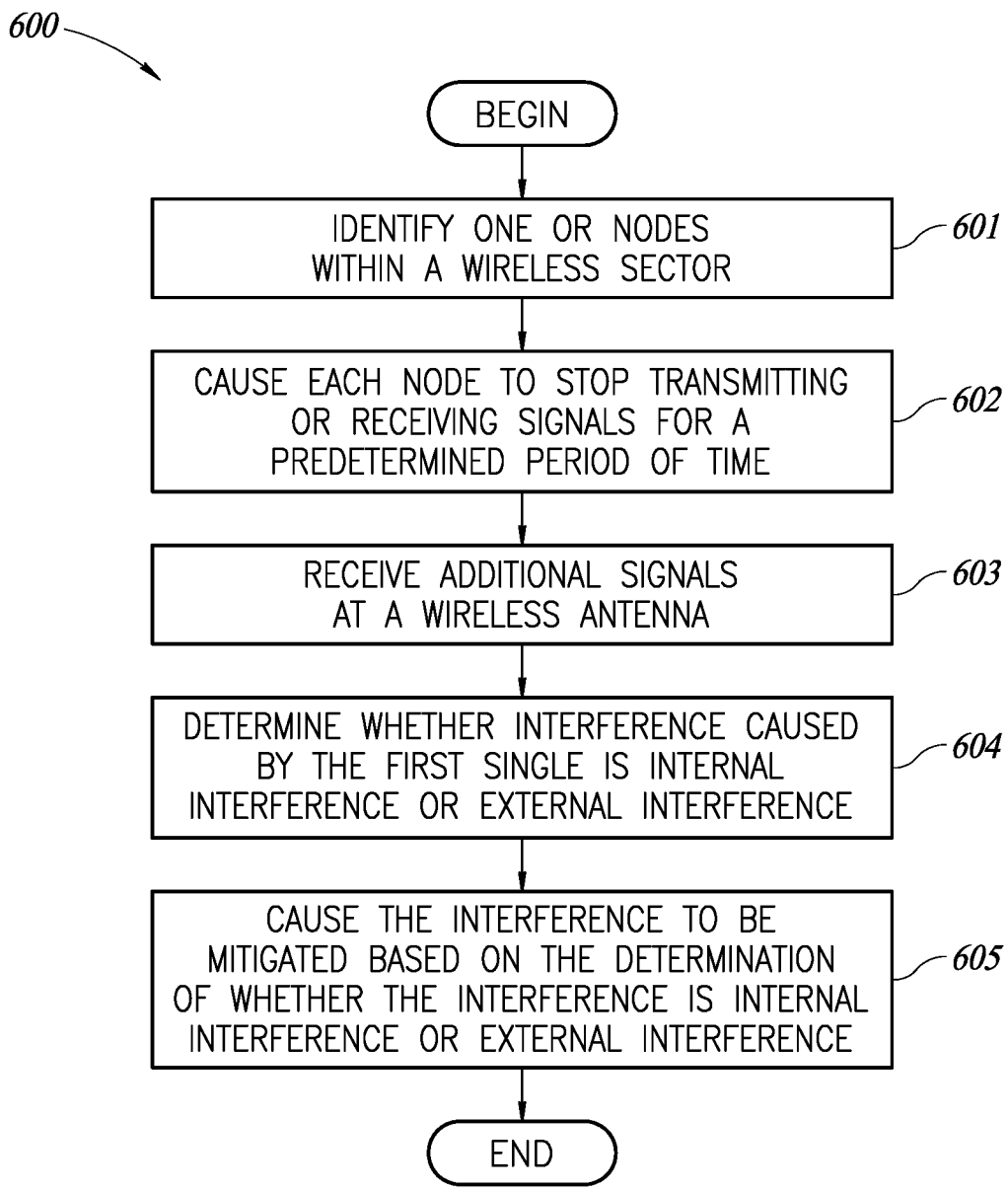
FIG. 6 is a flow diagram of a process for mitigating interference, according to various embodiments described herein.

FIG. 6 is a flow diagram of a process 600 for mitigating interference, according to various embodiments described herein. The process 600 begins, after a start block, at act 601, where the interference mitigation system identifies one or more nodes within a wireless sector. The identified nodes may be nodes in the same radio base station as the node that received the first signal, nodes in other radio base stations, or some combination thereof. The wireless sector may be the same wireless sector in which the node that received the first signal is located.

The process 600 proceeds to act 602, where the interference mitigation system causes each node to stop transmitting or receiving signals for a selected period of time. In some embodiments, at act 602, the interference mitigation system selects the period of time based on one or more of: a current load of the network, a schedule for signals to be transmitted to the one or more nodes, a time that the first signal was detected, and other aspects of the nodes, network, or interference. In some embodiments, the interference mitigation system uses the process described below in connection with FIG. 8 to perform act 602.

The process 600 proceeds to act 603, where the interference mitigation system receives additional signals at an antenna, such as an antenna included in the node that received the first signal. The additional signals may include signals that were not scheduled, managed, controlled, etc., by a node included in the wireless sector.

The process 600 proceeds to act 604, where the interference mitigation system determines whether interference associated with the first signal is internal interference or external interference. In some embodiments, the interference mitigation system uses the process described below in connection with FIG. 7 to perform act 604. The interference mitigation system may use the additional signals to determine whether the interference is internal interference or external interference. For example, the interference mitigation system may determine that the additional signals were being transmitted within the threshold power range, but were not scheduled to be transmitted or received by any of the nodes in the wireless sector. In this example, the additional signals may be more likely to be caused by a device operating outside of the network, but within the frequency bands and power ranges authorized for use by the network, and would be evidence of external interference. In another example, there may be few or no additional signals, which may be evidence of a fault in the device that transmitted the signal, the device that received the signal, or another fault on the network, because there are not many other signals that are causing interference.

In some embodiments, while performing act 604, the interference mitigation system receives additional data indicating one or more of: weather data, such as weather data in the wireless sector when the interference was detected; other instances in which the nodes has received a signal that exceeded the threshold power range; hardware faults occurring on the network; alarms related to network faults occurring on the network; cabling issues in the network; known sources of external interference, such as interfering devices that have caused interference in the past; or other data that may be related to a cause of the interference. The interference mitigation system may use the additional data to predict a cause of the interference, to determine whether the interference is internal interference or external interference, or to determine how to mitigate the interference. For example, cabling or other network issues may be evidence that the interference is internal, while interference which is similar to historical interference from interfering devices may be evidence that the interference is external.

The process 600 proceeds to act 605, where the interference mitigation system causes the interference to be mitigated based on the determination of whether the interference is internal interference or external interference.

In some embodiments, the interference mitigation system causes the interference to be mitigated by locating a source of the interference. The interference mitigation system may locate a source of the interference by adjusting the orientation of an antenna, such as changing antenna tilt, rotating the antenna, or other methods of changing the orientation of an antenna, in a node when receiving additional signals. Based on the signals received in the different orientations, the interference mitigation system may determine a location or direction of the interfering signals. The location or direction may then be used to locate a source of the interference.

In some embodiments, the interference mitigation system causes the interference to be mitigated by identifying an entity that is able to remedy the cause of the interference and transmitting a request to that entity to remedy the interference. For example, if the interference is internal interference and the cause is a cabling fault, the interference mitigation system may request that an engineer travel to the site of the cabling fault to remedy the fault. As another example, if the interference is external interference and the cause is an interfering device operated by an interfering entity known to operate interfering devices, the interference mitigation system may transmit a request to the interfering entity requesting that it stop operating the interfering device. In cases where the interfering entity is not known, the interference mitigation system may request that an engineer identify the interfering entity.

In some embodiments, the interference mitigation system mitigates the interference by instructing nodes within the wireless sector to schedule around the interference. For example, a node may schedule around the interference by adjusting the frequency band devices use to transmit data to the node, by changing the threshold power range so that it does not include the interfering signals, by scheduling fewer devices to transmit data when the interference is detected, or other methods of changing the schedule of a node to mitigate the effects of interference. Changing the schedule of the node may include transmitting instructions to user devices that causes the user devices to transmit signals according to the changed schedule.

In some embodiments, the interference mitigation system determines a priority measure for mitigating the interference, and causes the interference to be mitigated based on the priority. The priority may be determined based on data indicating the current load of the network. For example, if the network is experiencing a high load, it may be a higher priority to remedy the interference in order to ensure the quality of service provided to user devices is not greatly impacted by the interference. In another example, if the network is experiencing a low load, and not many network resources are currently being consumed to provide service to user devices, those resources may be re-allocated to the user devices in order to sustain their quality of service, and mitigation of the interference may be assigned a lower priority. In some cases, when the priority of the interference is below a threshold level, the interference may be ignored by the interference mitigation system. The re-allocation of network resources may include preventing devices from transmitting at certain frequency bands or power levels in order to avoid the interference, bringing more nodes online in the wireless sector, or other methods of re-allocating network resources to remedy interference.

In some embodiments, the re-allocation of network resources is based on the RSSI of signals received by the node. The RSSI may be used to re-allocate network resources by determining whether the interference has caused the RSSI to change by a threshold amount, and the interference mitigation system may choose whether to prevent certain network resources from being allocated based on the a determination that the RSSI has changed by the threshold amount.

For example, by using the process 600, the interference mitigation system may identify that interference is currently occurring on the network and may request that several nodes alter their schedules such that, for a selected period of time, the nodes do not receive or transmit any signals. In this example, the selected period of time may be on the order of milliseconds, such as 1-10 milliseconds long, but other embodiments or situations may require more or less time based on the factors used by the interference mitigation system to select the period of time. The interference mitigation system may then receive signals at the node that received the first signal, and use those additional signals to determine whether the interference was internal interference or external interference. Furthermore, by altering the schedules of other nodes, the interference mitigation system is able to prevent normal network traffic from impeding its search for the cause of the interference.

After act 605, the process 600 ends.

Figure 7:
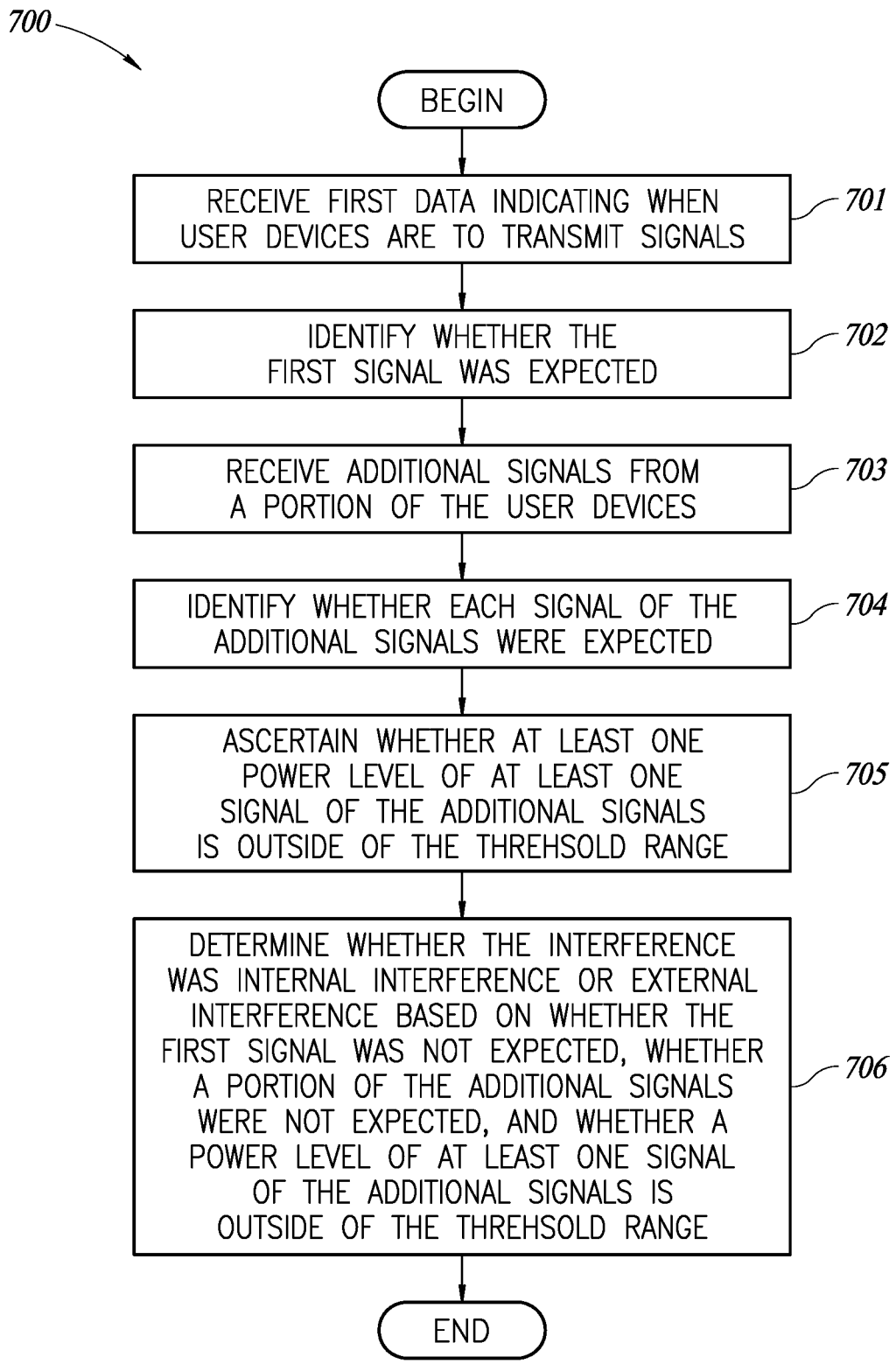
FIG. 7 is a flow diagram of a process for determining whether interference is internal interference or external interference, according to various embodiments described herein.

FIG. 7 is a flow diagram of a process 700 for determining whether interference is internal interference or external interference, according to various embodiments described herein. In some embodiments, at least part of the process 700 is performed during the selected time period where the interference mitigation system has instructed one or more nodes to stop transmitting or receiving signals, such as during act 602 of the process 600 described above in connection with FIG. 6. The process 700 begins, after a start block, at act 701 where the interference mitigation system receives scheduling data indicating when user devices are to transmit signals. The scheduling data may be generated by radio base stations, nodes within the radio base stations, or other components of the network.

The process 700 proceeds to act 702, where the interference mitigation system determines whether the first signal was expected by the node that received the first signal. The interference mitigation system may make this determination by comparing data describing the signal to the scheduling data to determine whether the signal was scheduled to be sent by a user device and received by the node.

The process 700 proceeds to act 703, where the interference mitigation system receives additional signals from devices within the wireless sector. The additional signals may be from user devices, such as user devices 103, interfering devices, such as the interfering device 105, or other devices that produce signals.

The process 700 proceeds to act 704, where the interference mitigation system identifies whether each signal of the additional signals were expected. The interference mitigation system may perform act 704 in a similar manner as act 702.

The process 700 proceeds to act 705, where the interference mitigation system ascertains whether at least one power level of at least one additional signal is outside of the threshold range. In some embodiments, a threshold range is the same threshold range used for the first signal, a different threshold range selected based on attributes of at least one of the additional signals, or some combination thereof.

The process 700 proceeds to act 706, where the interference mitigation system determines whether the interference was internal interference or external interference. The interference mitigation system may make this determination based on whether the first signal was expected, whether a portion of the additional signals were not expected, and whether a power level of at least one of the additional signals is outside of the threshold range.

For example, the interference mitigation system may identify that the first signal was not expected and that a portion of the additional signals were not expected. The interference mitigation system may then determine whether the signals are likely to come from the same source based on attributes of the signals, such as determining a distance that the signals traveled from their source, the direction the signals came from, the power levels of the signals, or other attributes of signals which may be useful to determine that the signals originated from the same source. Based on these determinations, the interference mitigation system may determine that the interference is likely external interference.

As another example, the first signal may be outside of the threshold power range and the interference mitigation system may identify that the first signal was expected because it was scheduled to be received at the time that it was detected by the node. The interference mitigation system may also not detect additional signals which are likely to come from the device that transmitted the first signal. Based on these determinations, the interference mitigation system may determine that the interference is likely internal interference.

After act 706, the process 700 ends.

Figure 8:
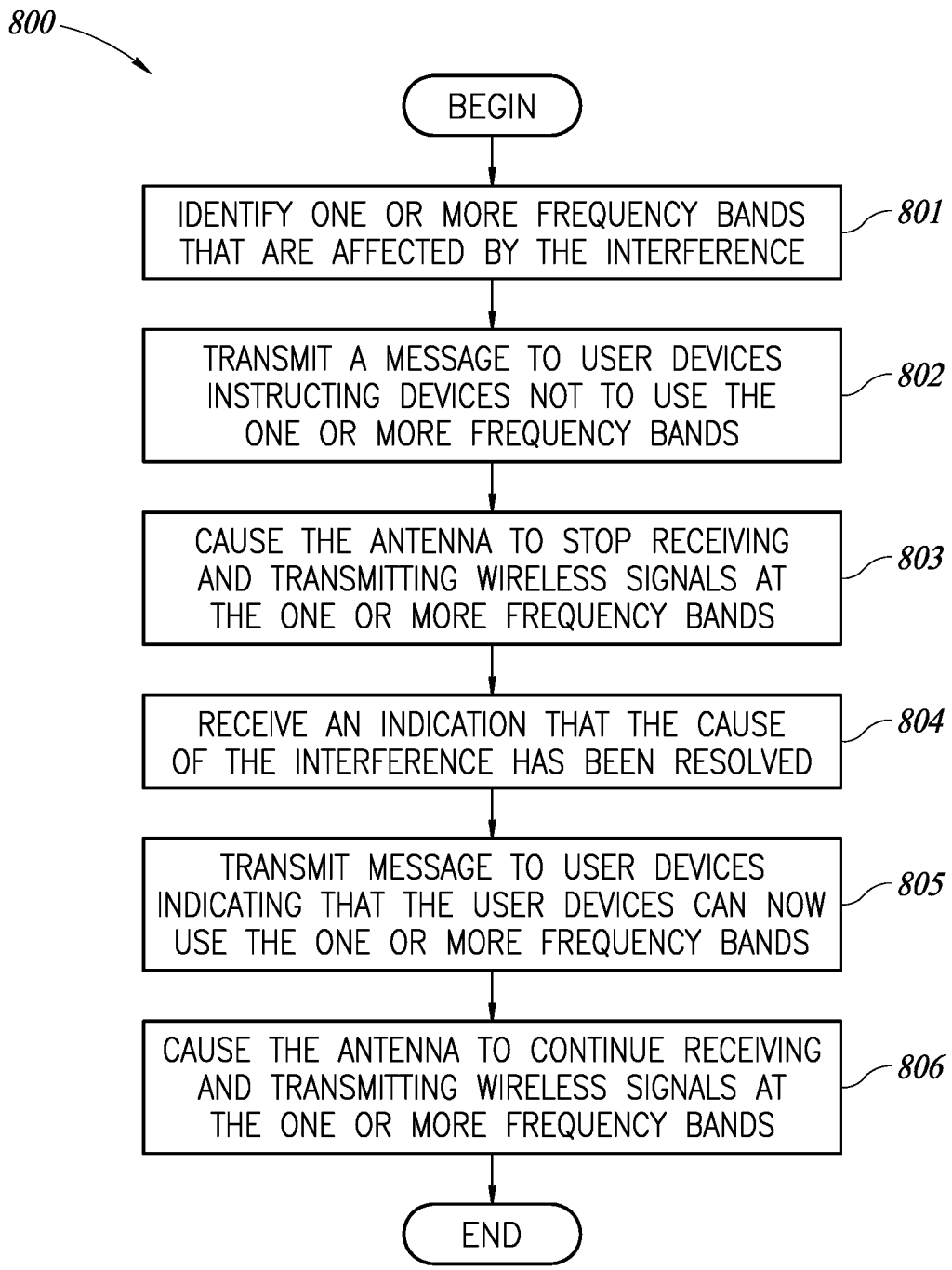
FIG. 8 is a flow diagram depicting a process for preventing a node from receiving or transmitting signals at certain frequency bands, according to various embodiments described herein.

FIG. 8 is a flow diagram depicting a process 800 for preventing a node from receiving or transmitting signals at certain frequency bands, according to various embodiments described herein. In some embodiments, at least part of process 800 may be performed as a part of mitigating the interference, as a part of identifying the type of interference, or some combination thereof. The process 800 begins, after a start block, at act 801, where the interference mitigation system identifies frequency bands affected by the interference. In some embodiments, the interference mitigation system identifies other attributes of the signals that are affected by the interference, such as their power level, attenuation, direction of travel, location, etc.

The process 800 proceeds to act 802, where the interference mitigation system transmits a message to user devices instructing the user devices not to use the one or more frequency bands. The message may include data that causes the user device not to use the one or more frequency bands. In some embodiments, where the interference mitigation system identifies other attributes of the signals affected by the interference, the device may be caused to take other actions, such as transmitting signals in a different direction, preventing the transmission of signals while the device is in a certain location, transmitting signals at different power levels, or other actions. The interference mitigation system, at act 802, may instruct the devices not to use the one or more frequency bands for a selected period of time.

The process 800 proceeds to act 803, where the interference mitigation system causes an antenna to stop receiving and transmitting wireless signals at the one or more frequency bands. The interference mitigation system may cause an antenna within a node, an entire node, an entire radio base station, multiple nodes, multiple radio base stations, or some combination thereof to stop receiving and transmitting wireless signals at the one or more frequency bands. In some embodiments, the interference mitigation system causes the antenna to stop receiving or transmitting signals for a selected period of time.

The process 800 proceeds to act 804, where the interference mitigation system receives an indication that the cause of the interference has been resolved. In some embodiments, instead of an indication that the cause of the interference has been resolved, the interference mitigation system receives an indication that a selected period of time used to receive additional signals has elapsed.

The process 800 proceeds to act 805, where the interference mitigation system transmits a message to user devices indicating that the user devices can resume normal operation. In some embodiments, act 805 is performed in a similar manner to act 802.

The process 800 proceeds to act 806, where the interference mitigation system causes the antenna to continue receiving and transmitting signals the one or more frequency bands. In some embodiments, act 806 is performed in a similar manner to act 803.

After act 806, the process 800 ends.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   at least one antenna configured to receive wireless signals;
   at least one processor; and
   at least one memory coupled to the at least one processor, the memory having computer-executable instructions stored thereon that, when executed by the at least one processor, cause the system to:
     select a threshold power range for signals received by the at least one antenna;
     receive, via the at least one antenna, a first signal within a sector of a wireless network, wherein the sector represents a geographic area within which the wireless network provides service to a plurality of user devices;
     determine whether a power level of the first signal exceeds the threshold power range; and
     in response to determining that the power level of the first signal exceeds the threshold power range:
       identify one or more nodes within the sector, wherein each node includes an antenna that is used to transmit or receive wireless signals;
       cause the one or more nodes to stop transmitting or receiving signals for a selected duration of time;
       in response to receiving one or more additional signals at the at least one antenna within the selected duration of time, determine whether interference caused by the first signal is internal interference or external interference based on the one or more additional signals; and
       cause the interference to be mitigated based on the determination of whether the interference is internal interference or external interference.

2. The system of claim 1, wherein the wireless network is a cellular telecommunication network and the at least one antenna is an antenna in a radio base station of the network.

3. The system of claim 1, wherein the computer-executable instructions, when executed by the at least one processor to receive the one or more additional signals, further cause the system to:

cause an orientation of the at least one antenna to change from a first orientation to the second orientation;

receive, at the at least one antenna, at least a portion of the one or more additional signals while the at least one antenna is in the second orientation; and identify a location of a source of the at least one signal of the one or more additional signals based on the additional signals and the portion of the additional signals.

4. The system of claim 1, wherein the computer-executable instructions, when executed by the at least one processor to determine whether the power level of the first signal exceeds the threshold power range for signals received by the at least one antenna, further cause the system to:

receive a location of a device that transmitted the first signal; and determine whether the power level of the first signal exceeds the threshold power range for signals received by the at least one antenna based on the data indicating the threshold power range and the location of the user device.

5. The system of claim 1, wherein the computer-executable instructions, when executed by the at least one processor, further cause the system to:

receive first additional data indicating one or more of:
  weather data;
  one or more periods of time in which the at least one antenna received a signal which exceeded the threshold power range;
  an indication of one or more hardware faults associated with at least one network component included in the network;
  an indication of one or more alarms associated with at least one network fault in the network;
  an indication of one or more cabling issues associated with the network; and
  an indication of one or more known sources of external interference; and predict, based on the first additional data and the determination of whether the first signal has caused internal interference or external interference, a cause of interference associated with the first signal.

6. The system of claim 5, wherein the computer-executable instructions, when executed by the at least one processor to cause the interference to be mitigated, further cause the system to:

identify, based on the predicted cause of the interference, one or more entities that are able to remedy the cause of the interference; and cause a message to be transmitted to at least one entity of the one or more entities instructing the at least one entity to remedy the cause of the interference.

7. The system of claim 5, wherein the computer-executable instructions, when executed by the at least one processor to cause the message to be transmitted to at least one entity of the one or more entities, further cause the system to:

receive second additional data indicating a current load of the network;

determine a measure of priority for remedying the cause of the interference based on at least the second additional data and the cause of the interference; and cause the interference to be mitigated based on the measure of the priority.

8. The system of claim 1, wherein the computer-executable instructions, when executed by the at least one processor to cause the interference to be mitigated, further cause the system to:

identify one or more frequency bands that are affected by the interference; and cause at least a portion of the plurality of user devices to stop using the one or more frequency bands that are affected by the interference.

9. A method in a radio base station, the method comprising:

receiving data indicating a threshold power range for signals received by the at least one antenna;

receiving, by at least one antenna included in the radio base station, a first signal;

determining whether a power level of the first signal is outside of the threshold power range; and based on the determination of whether the power level of the first signal is outside of the threshold power range:
  identifying one or more nodes;
  causing at least a portion of the one or more nodes to stop transmitting or receiving signals for a selected duration of time;
  receiving, within the selected duration of time, one or more additional signals;
  determining, based on at least the one or more additional signals, whether the first signal has caused internal interference or external interference; and
  causing the interference to be mitigated based on the determination of whether the interference is internal interference or external interference.

10. The method of claim 9, further comprising:

receiving, at the at least one antenna, one or more additional signals from devices located within a selected geographic area which includes at least one node of the one or more nodes;

for each respective signal of the one or more additional signals:
  determining, based on the first data, whether the respective signal was expected by at least one node included within the selected geographic area;

determining whether a power level of at least one signal of the one or more additional signals is outside of a threshold power range for signals received by the at least one antenna; and determining whether the first signal has caused internal interference or external interference based on the determination of whether the respective signal was expected by at least one node of the one or more nodes and the determination of whether the power level of at least one signal of the one or more additional signals is outside of a threshold power range for signals received by the at least one antenna.

11. The method of claim 9, wherein receiving the one or more additional signals further comprises:

causing an orientation of the at least one antenna to change;

receiving, at the at least one antenna, a portion of the one or more additional signals while the antenna is in a changed orientation, such that a portion of the one or more additional signals are received in the changed orientation and a portion of the one or more additional signals are received in the unchanged orientation; and identifying a location of a source of the at least one signal of the one or more additional signals based on the additional signals and the portion of the additional signals.

12. The method of claim 9, wherein determining whether the power level of the first signal is outside of the threshold power range further comprises:

determining a location of a source of the first signal;

determining a new threshold power range based on the location of the source of the first signal and a location of the radio base station; and determining whether the power level of the first signal is outside of the new threshold power range.

13. A non-transitory processor-readable storage medium that stores at least one of instructions or data, the instructions or data, when executed by at least one processor, cause the at least one processor to:

receive data indicating a threshold power range for signals received by at least one antenna;

receive, from the at least one antenna, an indication of a first signal within a wireless sector;

determine whether a power level of the first signal exceeds the threshold power range for signals received by the at least one antenna; and based on a determination that the power level of the first signal exceeds the threshold power range for signals received by the at least one antenna:

identify one or more nodes operating within the wireless sector;

cause each node of the one or more nodes to stop transmitting or receiving signals for a selected duration of time;

receive, within the selected duration of time, an indication of one or more additional signals from the at least one antenna;

determine, based on at least the one or more additional signals, whether interference caused by the first signal is internal interference or external interference; and cause the interference to be mitigated based on the determination of whether the interference is internal interference or external interference.

14. The non-transitory processor-readable storage medium of claim 13, wherein the at least one processor is further caused to:

receive first additional data, the first additional data indicating one or more of:

weather data;

one or more periods of time in which the at least one antenna received a signal which exceeded the threshold power range;

an indication of one or more hardware faults associated with at least one network component included in the network;

an indication of one or more alarms associated with at least one network fault in the network;

an indication of one or more cabling issues associated with the network; and an indication of one or more known sources of external interference; and predict, based on the first additional data and the determination of whether the first signal has caused internal interference or external interference, a cause of interference associated with the first signal.

15. The non-transitory processor-readable storage medium of claim 14, wherein to cause the interference to be mitigated the at least one processor is further caused to:

identify, based on the predicted cause of the interference, one or more entities which are able to remedy the cause of the interference; and cause a message to be transmitted to at least one entity of the one or more entities instructing the at least one entity to remedy the cause of the interference.

16. The non-transitory processor-readable storage medium of claim 14, wherein to cause the interference to be mitigated the at least one processor is further caused to:

receive second additional data, the second additional data indicating a current load of the network;

determine a measure of the priority for remedying the cause of the interference based on at least the third data and the cause of the interference; and cause the message to include an indication of the measure of the priority.

17. The non-transitory processor-readable storage medium of claim 13, wherein to cause the interference to be mitigated the at least one processor is further caused to:

identify one or more frequency bands that are affected by the interference; and transmit a message to at least a portion of the plurality of user devices, wherein the message instructs the portion of the plurality of user devices to stop using the one or more frequency bands that are affected by the interference.

* * * * *